March 25, 1952    E. WEBER ET AL    2,590,477
BOLOMETER
Filed Oct. 23, 1945
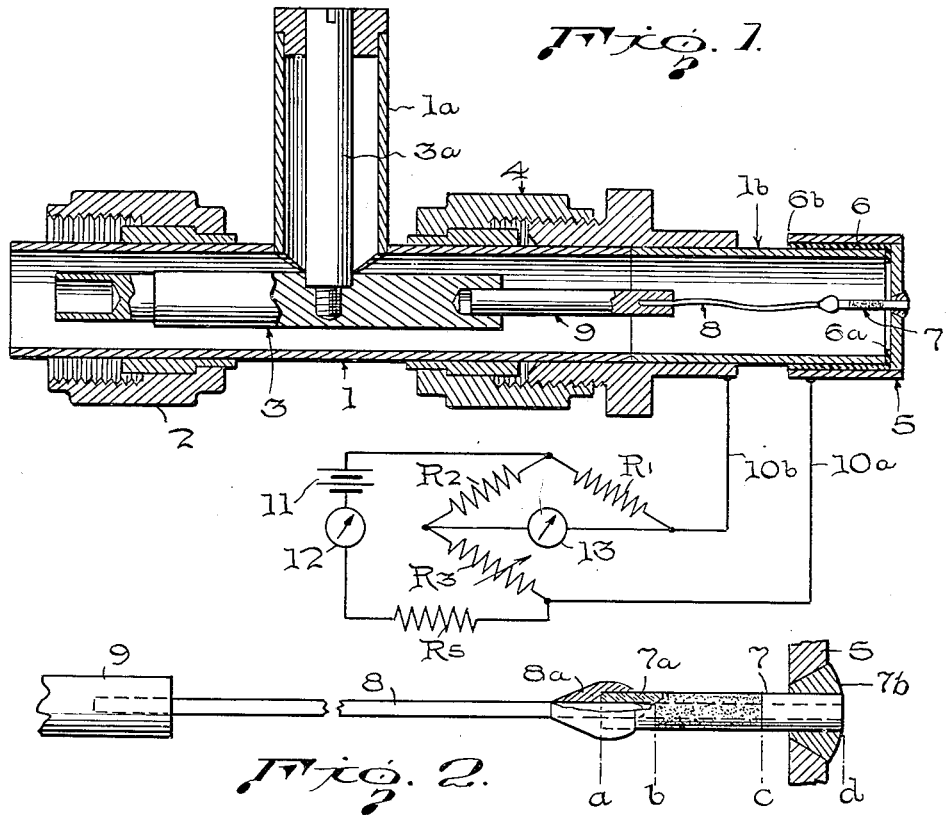
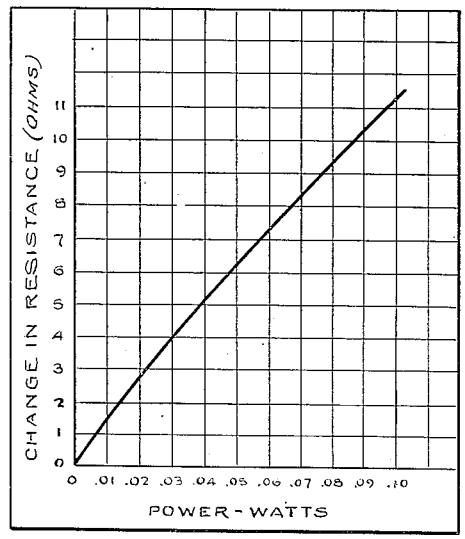
Inventors
ERNST WEBER
STANLEY A. JOHNSON
By Ralph B. Stewart
Attorney Patented Mar. 25, 1952

2,590,477

UNITED STATES PATENT OFFICE 2,590,477

BOLOMETER

Ernst Weber, Mount Vernon, and Stanley A. Johnson, New York, N. Y., assignors to Polytechnic Institute of Brooklyn, Brooklyn, N. Y., a corporation of New York Application October 23, 1945, Serial No. 624,032

2 Claims. (Cl. 178—44)

This invention relates to bolometers for the measurement of high frequency currents, and especially currents in the ultra-high frequency range.

Bolometers have been used heretofore for the measurement of radio frequency currents, and these devices involve a power absorbing element, the resistance of which varies with temperature. The change in resistance of the element is employed for indicating the amount of power absorbed by connecting the element in a measuring circuit which usually involved a Wheatstone bridge.

The present invention is concerned with the construction and mounting of the power absorbing element which sometimes is referred to as a "barretter wire."

An object of the invention is to devise a bolometer element suitable for the accurate indication of current or power at ultra-high frequencies.

A further object of the invention is to devise a bolometer element having a small thermal lag or small thermal transient time.

Another object of the invention is to devise a mounting structure for the bolometer element which will avoid errors due to wave reflection.

Still another object is to devise a bolometer having a relatively broad band characteristic in the ultra-high frequency range.

The preferred embodiment of our invention is illustrated in the accompanying drawing in which Figure 1 is a longitudinal sectional view of the bolometer structure together with one suitable circuit arrangement for measuring current or power;

Figure 2 is an enlarged view of the resistance element of the bolometer, a portion of the element being shown in section; and Figure 3 is a curve showing the operating characteristic of the resistance unit.

Referring to the drawing, Figure 1 shows a bolometer structure adapted for connection to a coaxial cable. The casing 1 of the bolometer is a tubular casing of the same diameter as the outer conductor of the coaxial cable and may be attached to the coaxial cable by a suitable threaded coupling sleeve 2. A center conductor 3 is mounted within the casing 1 and is supported by a quarter-wave T-stub support 3a mounted in a lateral extension 1a of casing 1, the conductor 3 being provided with a suitable socket in its left end for connection with the center conductor of the coaxial cable. The casing 1 is provided with a terminal portion 1b which is joined to the casing 1 by a threaded coupling sleeve 4. The end of tubular section 1b is closed by means of a terminal cap 5, and an insulating sleeve or bushing 6 is interposed between the cap 5 and the tube 1b. This bushing is preferably formed of polystyrene, although other insulating materials may be used. The cap 5 and the bushing 6 are constructed so that the distance from one end of the sleeve 6 indicated at 6a to the other end 6b is substantially equal to one-quarter of the mid band frequency. The purpose of the insulating bushing 6 is to insulate the cap 5 from the casing 1b for direct currents but to present a virtual short-circuit between these elements at the point 6a for ultra-high frequency currents.

The resistance element 7 of the bolometer is mounted at the center of the end wall of cap 5, and is connected to the center conductor 3 by means of two quarter-wave matching transformer sections 8 and 9.

The construction of resistance element 7 will be explained in connection with Figure 2 which shows the element and its supporting structure on a larger scale. The resistance element is formed as a high resistance metallic film carried by an insulating tube 7a such as glass. The tube is divided into linear sections as shown by a, b, c and d in Figure 2. The two end sections a—b and c—d are covered on the outside with a low resistance metallic film or collar, and the intermediate section b—c is covered with a high resistance metallic film and constitutes the effective portion of the element. A part of the section c—d extends through a hole formed in the end wall of cap 5 and is secured in position by means of a soldered connection 7b. The transformer section 8 is formed of a small metallic wire or conductor having one end soldered in a bore formed in the end of transformer section 9 and the other end extends into the end of tube 7a. The transformer 8 is electrically connected to the resistance element 7 by a soldered connection 8a surrounding adjacent portions of the transformer 8 and section a—b of the element 7.

The resistance element 7 may be formed in different ways. For example, a high resistance metallic film may be deposited on the tube 7a throughout its length, either from a metallic solution followed by baking, or by thermal evaporation. The low resistance collars a—b and c—d may then be applied over the high resistance coating and after this the high resistance film section b—c may be adjusted to the desired resistance value, either by increasing the thickness of the film, or by shortening the section b—c. Alternatively, the low resistance collars a—b and c—d may be applied first and then the high resistance coating applied throughout the length of the tube until the desired resistance is obtained between the points b—c.

The metallic film formed in the section b—c should be very thin and have a wall thickness preferably less than the depth of penetration. The depth of penetration is the depth in a solid metal conductor at which the curent density is equal to 1/e of the density at the surface of the conductor, e being the base of natural logarithms. This depth is known or can easily be determined for any known metal at any given frequency. This film should be formed of a metal having a relatively large temperature coefficient, such as platinum or an alloy of platinum and silver.

In order to reduce the thermal lag of the bolometer, the tube 7a should have as little mass as is consistent with the mechanical requirements of the construction. Simply by way of example, the dimensions will be given for a bolometer resistance element suitable for measuring power up to 0.1 watt for wavelengths from 8.5 to 11.5 centimeters. The tube 7a is made of glass having an outside diameter of 0.017 inch and a wall thickness of approximately 0.003". The active section b—c has a length of 0.7 cm., the coating in this section being formed of an alloy of 70% platinum and 30% silver. The D. C. resistance of the active section b—c is approximately 330 ohms. Thus the diameter of the film on tube 7a is of the order of one-half of one percent of the shortest wave length of the current to be measured.

By using a very thin glass tubing of small diameter, the thermal lag of the meter is reduced to a point where it is not objectionable. In the example given above, the thermal lag, or the time required for the temperature to reach equilibrium, is less than five seconds.

The active section b—c of the resistance element 7 should be of a length to present a real resistance at the input end b of the section at the frequency of the currents being measured, and it is preferred that this section have a length relatively short by comparison with the wavelengths of the currents being measured. For the purpose of matching the real resistance of the element 7 with the characteristic impedance of the coaxial cable, the two quarter-wave matching line sections 8 and 9 are interposed between the element 7 and the center conductor 3 which constitutes a continuation of the center conductor of the coaxial cable. In the example given above, the transformer section 8 is formed of a copper wire of No. 30 gauge, one end of the wire being soldered in a bore formed in the end of matching section 9 and the other end being joined to the end of tube 7a as explained above. To prevent damage from mechanical strains the wire 8 should be bent slightly as shown in Figure 1. The wire 8 should have a length such that the distance from the end of the transformer 9 to the point b on element 7 is substantially 0.95 inch. Transformer section 9 also has a length equal substantially to one-quarter of the mid frequency wavelength and the diameter of this section is approximately ⅛ inch. The foregoing dimensions are given for the measurement of power transmitted over a standard ⅝ inch coaxial cable having a center conductor of 0.25 inch diameter. This arrangement provides a broad band characteristic for the bolometer, there being less than 4% power reflection for wavelengths between 8 and 12 cm. and less than 1% power reflection for wavelengths between 9 and 11 cm.

The bolometer described herein may be used with a number of different measuring circuits already known. One suitable circuit is shown in Figure 1 where the bolometer is included as one arm in a Wheatstone bridge having three additional resistance arms R1, R2 and R3. The bolometer resistance element 7 is included in the bridge as the fourth arm by a connection 10a leading to the cap 5 and a connection 10b leading to any part of the casing of the bolometer. A direct current circuit through the element 7 is completed from the casing through stub support 3a, through center conductor 3 and through transformer elements 8 and 9 to the element 7. Direct current is normally supplied to two diagonal points of the bridge from a suitable D. C. source 11 through a meter 12 and through a high resistance R5. A sensitive meter or galvanometer 13 is connected between the remaining diagonal points of the bridge.

The preferred method of operating the arrangement shown in Figure 1 is to first balance the Wheatstone bridge without any high frequency currents flowing in the bolometer. This is done by varying resistance R3. After the bridge is balanced, then the high frequency power is supplied to the bolometer and the resistance of the element 7 will change due to the heat generated therein by the high frequency currents. This unbalances the bridge and produces an indication on the meter 13. Where the active section of the element 7 is short compared to the wavelength of the currents being measured so that the power distribution is uniform then the same resistance change will be produced in the element for the same power absorption for either direct currents or ultra-high frequency currents.

Figure 3 shows a typical characteristic curve of the bolometer described herein, and this curve shows the amount of change in resistance of the element 7 for different values of power absorption. As will be seen, there is practically a straight line relation between the resistance change and the power absorption. Furthermore, there is practically no difference between the A. C. calibration and the D. C. calibration. Thus, our bolometer can be used to measure ultra-high frequency power directly.

The construction shown in Figure 1 permits ready replacement of the resistance element 7. In practice, the element 7 and the transformer 8 will be formed as a unit, and when it becomes necessary to replace this unit, it is only necessary to melt out the soldered connection 7b between the tube 7 and the cap 5 and then remove the end section 1b of the casing by unscrewing the coupling sleeve 4. The unit 7—8 may now be removed by melting the soldered connection between the transformer 8 and the transformer 9, and a new unit may be inserted by performing the reverse operations.

By reason of the broad band characteristic of our bolometer, it may be used for the measurement of the power output of an ultra-high frequency oscillator at different frequencies.

Another useful application of the bolometer is found in the measurements for determining the amount of attenuation produced by attenuators. This is accomplished by measuring the power transmitted in front of the attenuator and then measuring the power behind the attenuator, and the difference between the two readings will indicate the amount of attenuation produced by the attenuator.

From the foregoing it will be seen that the bolometer of our invention is formed of uniform line sections which may be easily constructed. The bolometer involves four line sections consisting of the element 7, the transformer 8, the transformer 9 and the center conductor section 3. The line section formed of the resistance element 7 is a uniform line of comparatively high resistance and having a length such that the total input impedance becomes equal to a real resistance irrespective of the characteristic impedance of the main transmission system. This real resistance is then transformed to match the characteristic impedance of the line or transmission system by means of the two quarter-wave transformers 8 and 9, and thus a broad band characteristic is obtained.

The bolometer structure of the present invention provides an arrangement where there is no interference between the high frequency currents being measured and the direct current used for normally biasing or energizing the measuring bridge. It will be seen that the direct current is supplied to the bolometer resistance element through the insulated cap or closure 5, and the return path for the direct current is through the quarter-wave support 3a for the center conductor 3, which support acts as an open circuit for the currents being measured but offers a low resistance path for the direct current. Also, the tubular flange of the cap 5 which has telescoping relation with the end of the casing section 1b constitutes a quarter-wave open line for short-circuiting the high frequency currents from the end of the cap 5 to the tubular casing, but prevents the flow of direct current. The telescoping portion of the cap may also be considered as a condenser element for maintaining the end of the cap at the same potential as the bolometer casing with respect to high frequency currents, so that if the casing is considered to be at ground potential, then the telescoping flange of the cap 5 serves to maintain the end of the cap at ground potential with respect to A. C. currents. It will be obvious that other structures may be devised for preventing the flow of direct current from the output terminal of the bolometer resistance to the metallic casing while offering low impedance to the flow of high frequency currents between these two points.

Other arrangements may be used for matching the input impedance of the bolometer element with the characteristic impedance of the center conductor. For example, the section of the center conductor adjacent the bolometer element may taper uniformly from the external diameter of the center conductor to the external diameter of the bolometer element, and the tapered section would have a length equal to or larger than the largest wave length of the current to be measured.

While the particular example given herein has a limited power capacity, it will be understood that the capacity of the bolometer may be effectively increased by the insertion of one or more suitable attenuators in front of the bolometer. Also, the invention is not limited to the specific example given above.

We claim:

1. A bolometer structure for the measurement of current in the ultra-high frequency range comprising a tubular metallic casing, a closure for one end of said casing, a transmission conductor arranged centrally within said casing and having a gap between its end and said closure, a bolometer resistance element mounted within said casing and connected between the end of said conductor and said casing, said resistance element comprising a thin-walled dielectric carrier having a thin metallic film formed thereon of a thickness of less than the depth of penetration of the current to be measured, said resistance element having a length which is of the order of one-tenth of the shortest wave length of the current to be measured thereby to present a real resistance at the input terminal thereof when mounted in said casing, and means interposed between said resistance element and said conductor for matching said input resistance to the characteristic impedance of said conductor.

2. A bolometer according to claim 1 wherein said carrier comprises a glass tube arranged in axial alignment with said conductor and having a diameter of the order of one-half of one percent of the shortest wave length of the current to be measured, and said matching means comprises two quarter-wave line sections of different diameters interposed between said conductor and said tube.

ERNST WEBER.
STANLEY A. JOHNSON.

REFERENCES CITED

The following references are of record in the file of this patent:

UNITED STATES PATENTS

| Number | Name | Date |
| --- | --- | --- |
| 2,151,157 | Schelkunoff | Mar. 21, 1939 |
| 2,183,755 | Shottky | Dec. 19, 1939 |
| 2,241,616 | Roosenstein | May 13, 1941 |
| 2,351,895 | Allerding | June 20, 1944 |
| 2,366,614 | Hansell | Jan. 2, 1945 |
| 2,373,160 | Bollman | Apr. 10, 1945 |
| 2,399,674 | Harrison | May 7, 1946 |
| 2,410,706 | Bradley | Nov. 5, 1946 |
| 2,411,553 | Ramo | Nov. 26, 1946 |
| 2,419,613 | Webber | Apr. 29, 1947 |
| 2,434,610 | Feiker | Jan. 13, 1948 |
| 2,473,495 | Webber | June 14, 1949 |

FOREIGN PATENTS

| Number | Country | Date |
| --- | --- | --- |
| 537,085 | Great Britain | June 9, 1941 |

OTHER REFERENCES

"Das Bolometer als Leistungsmesser bei sehr kurzen Wellen" from Elektrische Nachrichten-Technik, Heft 3/4 Band 19, published March/April 1942 in Germany (pages 27–40, especially pages 38 and 39).